(12) United States Patent
Kolberg

(10) Patent No.: US 7,458,442 B2
(45) Date of Patent: Dec. 2, 2008

(54) ELECTRIC BRAKE HAVING PARKING BRAKE FUNCTION

(75) Inventor: David A. Kolberg, Granger, IN (US)

(73) Assignee: Honeywell International Inc., Morristown, NJ (US)

( * ) Notice: Subject to any disclaimer, the term of this patent is extended or adjusted under 35 U.S.C. 154(b) by 68 days.

(21) Appl. No.: 11/378,247

(22) Filed: Mar. 20, 2006

(65) Prior Publication Data

US 2006/0219492 A1    Oct. 5, 2006

Related U.S. Application Data

(60) Provisional application No. 60/664,208, filed on Mar. 23, 2005.

(51) Int. Cl.
    *B60T 13/66* (2006.01)
(52) U.S. Cl. .................................. 188/1.11 E; 188/156
(58) Field of Classification Search ............. 188/1.11 L, 188/1.11 E, 71.5, 156–162, 2 D, 158–164; 303/20, 89, 115.4
    See application file for complete search history.

(56) References Cited

U.S. PATENT DOCUMENTS

| | | | | |
|---|---|---|---|---|
| 5,348,123 | A | * | 9/1994 | Takahashi et al. .......... 188/72.1 |
| 5,620,077 | A | | 4/1997 | Richard |
| 5,785,157 | A | | 7/1998 | Scott et al. |
| 6,040,665 | A | * | 3/2000 | Shirai et al. .................... 318/14 |
| 6,446,768 | B2 | * | 9/2002 | Kikuta et al. ................ 188/162 |
| 6,536,561 | B1 | | 3/2003 | Keller |
| 6,744,162 | B2 | | 6/2004 | Pierre et al. |
| 6,776,251 | B2 | | 8/2004 | Landmann |
| 6,851,761 | B2 | | 2/2005 | Baumgartner et al. |
| 6,918,470 | B2 | | 7/2005 | Guaraldo et al. |
| 6,959,794 | B2 | | 11/2005 | Ralea et al. |

(Continued)

FOREIGN PATENT DOCUMENTS

EP    1138971 A2    10/2001

(Continued)

*Primary Examiner*—Christopher P Schwartz
(74) *Attorney, Agent, or Firm*—Birch, Stewart, Kolasch & Birch, LLP

(57) ABSTRACT

An electromagnetic braking system includes a brake stack (20), a ram (18) shiftable in a first linear direction toward and against the brake stack (20) and in a second linear direction opposite the first linear direction, a motor (12) having an output shaft (14) mechanically connected to the ram (18) and rotatable in a first rotation direction for moving the ram (18) in the first linear direction and in a second rotation direction for moving the ram (18) in the second linear direction, at least one friction member (32, 34, 41, 43, 52) having a friction surface (33, 35, 43, 55) mounted adjacent to the motor output shaft (14), and an friction surface (33, 35, 43, 55) for moving the friction surface (33, 35, 43, 55) of the at least one friction member (32, 34, 41, 43, 52) against the motor output shaft (14) in a non-locking manner and holding the friction member (32, 34, 41, 43, 52) against the motor output shaft (14) with a predetermined force to perform a park brake function, wherein the predetermined force is low enough to allow the output shaft (14) to slip when a rotational force on the output shaft (14) exceeds a given level. Also a method for performing a park brake function.

12 Claims, 2 Drawing Sheets

U.S. PATENT DOCUMENTS

| | | |
|---|---|---|
| 7,108,107 B2 * | 9/2006 | Ralea et al. ............. 188/1.11 L |
| 2004/0168866 A1 | 9/2004 | Osterday et al. |
| 2005/0082908 A1 | 4/2005 | Klode et al. |
| 2005/0109565 A1 * | 5/2005 | Ralea et al. ................ 188/71.5 |
| 2005/0109568 A1 * | 5/2005 | Ether ......................... 188/156 |
| 2005/0247529 A1 | 11/2005 | Gaines et al. |
| 2005/0269872 A1 * | 12/2005 | Ralea ......................... 303/20 |
| 2006/0131113 A1 * | 6/2006 | Christof et al. ............ 188/72.1 |
| 2006/0152074 A1 * | 7/2006 | Chico et al. .................... 303/89 |
| 2006/0170282 A1 * | 8/2006 | Yamaguchi et al. ........... 303/20 |
| 2006/0186731 A1 * | 8/2006 | Bach ........................... 303/89 |

FOREIGN PATENT DOCUMENTS

| | | | |
|---|---|---|---|
| EP | 1 538 051 A1 | | 9/2005 |
| JP | 7-89420 | * | 4/1995 |
| JP | 7-144636 | * | 6/1995 |
| JP | 07291120 | * | 11/1995 |
| JP | 8-72702 | * | 3/1996 |
| WO | WO-01/85593 A1 | | 11/2001 |

* cited by examiner

ELECTRIC BRAKE HAVING PARKING BRAKE FUNCTION

CROSS-REFERENCE TO RELATED APPLICATIONS

The present application claims the benefit of U.S. Provisional Application No. 60/664,208 filed Mar. 23, 2005, the entire contents of which are hereby incorporated by reference.

FIELD OF THE INVENTION

The present invention is directed to an electric brake having a parking brake function and to a method of using an electric brake as a parking brake, and, more specifically, toward an electric brake having a parking brake function configured to limit a brake force as the temperature of the brake changes and a method of operating an electric brake as a parking brake that accommodates temperature changes.

BACKGROUND OF THE INVENTION

Brakes, such as those used on aircraft wheels, often include a brake disk stack comprising a plurality of rotors connected to a wheel which rotors rotate between a plurality of stators fixed to a torque tube on a wheel support. An actuator is used to compress the brake disk stack and bring the rotors and stators into contact in order to slow the wheel.

In electric brakes, the actuator is an electromechanical actuator having a piston that is driven toward and away from the brake disk stack by an electric motor. It is generally necessary to maintain power to the electric motor to hold the actuator against the brake disk stack with a given braking force. However, if a braking force needs to be held for a relatively long time, while an aircraft is parked, for example, a continued application of pressure by the piston wastes energy, generates excess heat, and may prematurely wear out the electric motor.

It is known that a parking (or long term) brake function can be achieved with electric brakes by applying pressure against the brake disk stack and then mechanically locking the shaft of the motor that drives the actuator. Power can then be removed from actuator, and the locked motor shaft will prevent the actuator from moving. In this manner, the wheels of an aircraft can be locked for relatively long periods of time, overnight, for example, using little or no power to maintain a required braking force.

The temperature of an aircraft brake system increases significantly after a landing, and this temperature increase causes the heated parts of the brake system to expand. As heat from the brake disks is transferred to the torque tube supporting the stators, the torque tube heats and expands, carrying the brake disk stack away from the piston. Therefore, if the piston is locked in place shortly after a landing, the brake force generated by the piston will decrease for several minutes thereafter as the torque tube heats and expands and moves away from the piston. Then, as the torque tube cools, it will contract and move the brake disk stack back toward the piston. Since the piston was locked in place when the torque tube was hot, when the torque tube cools it will press the brake disks against the piston with a great force and may damage or destroy the brake and actuator.

This problem can be avoided by maintaining power to the brake controller and continuously measuring the force exerted by the piston on the brake stack (or vice versa) and adjusting the position of the piston in order to maintain the brake force between a given minimum and maximum. Alternately, to conserve power, the control system may be shut down and then periodically powered up to determine whether a change in brake piston position is needed. However, it may take several hours for aircraft brakes to fully cool, and thus the control system must stay active, or be repeatedly reactivated, for a period of several hours. It would be desirable to provide a system for adjusting brake piston position in response to brake temperature changes that will accommodate brake heating and cooling after a landing while at the same time conserving power and minimizing involvement of a control system.

SUMMARY OF THE INVENTION

The above problems and others are addressed by the present invention which comprises, in a first aspect, a method used in an electromagnetic braking system that includes a brake stack, a ram shiftable in a first linear direction toward and against the brake stack and a second linear direction opposite the first linear direction, and a motor having an output shaft mechanically connected to the ram and rotatable in a first rotation direction to move the ram in the first linear direction and in a second rotation direction to move the rain in the second linear direction. The method allows a park brake operation to be performed with the braking system that limits the force exerted by a cooling brake stack on the motor. The method involves providing at least one friction member having a friction surface adjacent to the motor output shaft, moving the at least one friction surface against the motor output shaft in a non-locking manner, and holding the at least one friction surface against the output shaft with a predetermined force to perform the park brake operation. The predetermined force is low enough to allow the motor output shaft to rotate relative to the friction surface when the cooling brake stack contracts and applies a force against the ram.

Another aspect of the invention comprises an electromagnetic braking system that includes a brake stack, a ram shiftable in a first linear direction toward and against the brake stack and in a second linear direction opposite the first linear direction and a motor having an output shaft mechanically connected to the ram and rotatable in a first rotation direction to move the ram in the first linear direction and in a second rotation direction to move the ram in the second linear direction. At least one friction member having a friction surface is mounted adjacent to the motor output shaft, and an actuator is provided for moving the friction surface of the at least one friction member against the motor output shaft in a non-locking manner and holding the friction member against the motor output shaft with a predetermined force to perform a park brake function. The predetermined force is low enough to allow the output shaft to slip when a rotational force on the output shaft exceeds a given level.

An additional aspect of the invention is a method used with an electromagnetic braking system that includes a brake stack, a ram shiftable in a first linear direction toward and against the brake stack and a second linear direction opposite the first linear direction, and a motor having an output shaft mechanically connected to the ram and rotatable in a first rotation direction to move the ram in the first linear direction and in a second rotation direction to move the ram in the second linear direction. The method provides a park brake operation and limits the braking force applied by the ram to the brake stack as the brake stack cools. The method includes the steps of generating a given output force with the motor, pressing a friction member against the motor output shaft in a non-locking manner with a predetermined force, reducing the motor output force, reapplying the given output force, moving the friction member away from the output shaft, moving the friction member against the output shaft, reducing the motor output force, and holding the friction member against the motor output shaft with the predetermined force while the brake stack cools until after a force applied by the cooling disk stack against the ram causes the output shaft to slip relative to the friction member.

DETAILED DESCRIPTION

Figure 1:
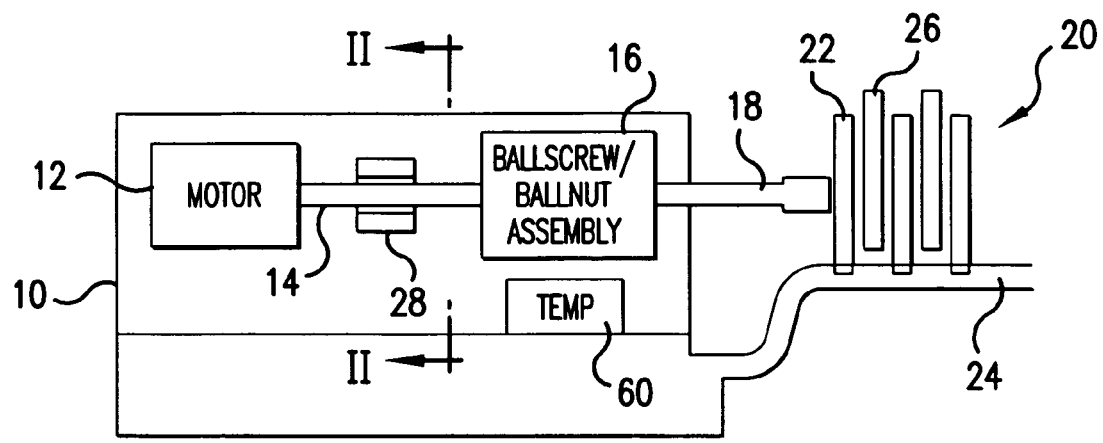
FIG. 1 schematically illustrates an aircraft system having a brake disk stack and an electromechanical actuator including an electric motor, a motor shaft, and a piston for selectively applying pressure against the brake disk stack.

Referring now to the drawings, wherein the showings are for purposes of illustrating preferred embodiments of the invention only and not for the purpose of limiting same, FIG. 1 shows an electromechanical actuator 10 including a motor 12 having an output shaft 14 connected to a ballscrew/ballnut assembly 16. Motor 12 turns shaft 14 to adjust the relative positions of a ballnut and ballscrew (not shown) in the ballscrew/ballnut assembly 16 to vary the position of piston 18 (sometimes referred to herein as an actuator or a ram). The electromechanical actuator 10 is mounted adjacent a brake disk stack 20 that comprises a plurality of stators 22 mounted on a torque tube 24 and a plurality of rotors 26 mounted on a wheel (not shown) and extending between pairs of stators 22. The wheel to which rotors 26 are mounted can be braked by driving piston 18 against brake disk stack 20 to move the rotors 26 and stators 22 into contact.

FIG. 1 also illustrates a holding mechanism 28 for holding motor shaft 14 in order to perform a parking brake function, that is, to prevent shaft 14, and therefore piston 18, from moving even when power to motor 12 is removed. Holding mechanism 28 does not lock shaft 14, but rather holds shaft 14 in place as long as the torque on shaft 14 is less than or equal to a predetermined value. When the torque on shaft 14 exceeds this value, the shaft slips in holding device 28 and back drives motor 12. Moving shaft 14 and back driving motor 12 reduces the torque on shaft 14 to less than the predetermined value, and at that point, slipping stops and shaft 14 is once again held in position.

Figure 2:
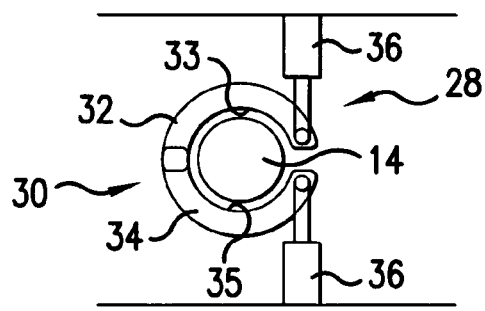
FIG. 2 schematically illustrates a mechanism for holding the motor shaft of FIG. 1.

FIG. 2 illustrates one example of a suitable holding mechanism 28. In this embodiment, the holding mechanism comprises a clamp 30 having a first jaw or friction member 32 and second jaw or friction member 34 which are selectively closed about shaft 14 by actuators 36 causing friction surfaces 35 on the friction members to contact shaft 14. The force applied against shaft 14 is adjusted so as not to lock the shaft against all rotation but only to hold shaft 14 in place until the torque thereon exceeds a predetermined value. Thus, the force is high enough to substantially prevent shaft rotation and perform a park brake function, but low enough to allow shaft 14 to rotate when the force applied against ram 18 by a cooling and contracting brake stack and torque tube exceeds a certain value. Once shaft 14 has rotated under this force to relieve stress, it is held in this new position and maintains a required force on shaft 14 to perform a park brake function.

Figure 3:
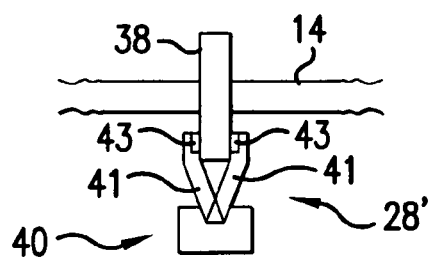
FIG. 3 schematically illustrates a first alternative mechanism for holding a motor shaft similar to the motor shaft of FIG. 1.

FIG. 3 illustrates a first alternative holding mechanism 28'. In this arrangement, motor shaft 14 includes or is provided with an annular flange 38 that is fixed to and rotates with shaft 14. A clamping arrangement 40 that includes first and second friction members 42 having friction surfaces 44 is then used to resist movement of flange 38 and thus shaft 14. The clamping force applied to flange 38 is selected to maintain the position of shaft 14 until the torque on the shaft exceeds a predetermined value at which point the flange 38 slips in clamping device 40 to reduce the torque on shaft 14.

Figure 4:
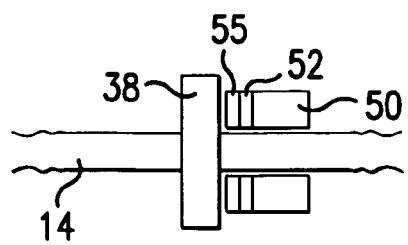
FIG. 4 schematically illustrates a second alternative mechanism for holding the motor shaft similar of FIG. 3.

FIG. 4 illustrates a second alternative holding mechanism 28''. In this arrangement, a solenoid 50 selectively drives a friction disk 52 coaxial with shaft 14 against a side face of flange 38. The force applied against flange 38 by solenoid 50 is selected to maintain the position of shaft 14 until the torque on the shaft exceeds a predetermined value at which point the flange 38 slips relative to disk 52 to reduce the torque on shaft 14.

In operation, an aircraft on which brake disk stack 20 is mounted lands, and the friction between the rotors 26 and stators 22 heats the rotors and stators to over 1000° C. in a matter of seconds. Some of this heat is dissipated in the air surrounding the rotors and stators and some is absorbed by torque tube 24 which heats and expands. The aircraft taxis to a parking position, and piston 18 is driven against brake disk stack 20 with a required force. Shaft 14 is locked in place by holding mechanism 28 to achieve a parking brake function.

Because torque tube 24 continues to absorb heat as the brake disk stack 20 cools, it continues to expand and move brake disk stack 20 away from piston 18. The force applied by piston 18 will therefore decrease as the torque tube 24 expands. Therefore the braking force may fall below a required level. To maintain a required minimum level of force, a controller (not shown) periodically reapplies a required braking force using motor 12 and then releases holding mechanism 28. If motor 12 turns and moves piston 18, a force adjustment was needed. When the proper force is again applied against brake disk stack 20, holding mechanism 28 re-secures shaft 14. The controller can repeat these actions at predetermined time intervals or alternately, determine the appropriate time interval for rechecking the force applied by piston 18 based on how far motor 12 turned at the last check (the further the motor turns, the sooner the force applied by the piston needs to be rechecked). As a further alternative, a temperature sensor 60 may be provided for determining the temperature of the brake system. A controller can then continue to adjust the position of ram 18 as the temperature increases and shut down when no further temperature increases are detected.

Once the torque tube stops expanding, or when the motor 12 turns in the opposite direction, indicating that torque tube 24 is starting to cool and contract, no further checks are necessary. This is because, as discussed above, as torque tube 24 cools and contracts and increases the force on piston 18, holding mechanism 28 will allow shaft 14 to turn when the torque reaches a predetermined level and back drive motor 12 until the torque drops to an acceptable level.

Torque tube 24 continues to heat after landing for a short period of time, several minutes, for example. However, it may take several hours for the torque tube to cool to ambient temperature. Embodiments of the present invention, therefore, reduce the number of times that a controller must check the force being applied to brake stack 20. Once expansion of torque tube 24 has ended, no further checks are needed. The holding mechanism 28 compensates for temperature decreases and maintains a predetermined brake force without further control by the controller.

Figure 5:
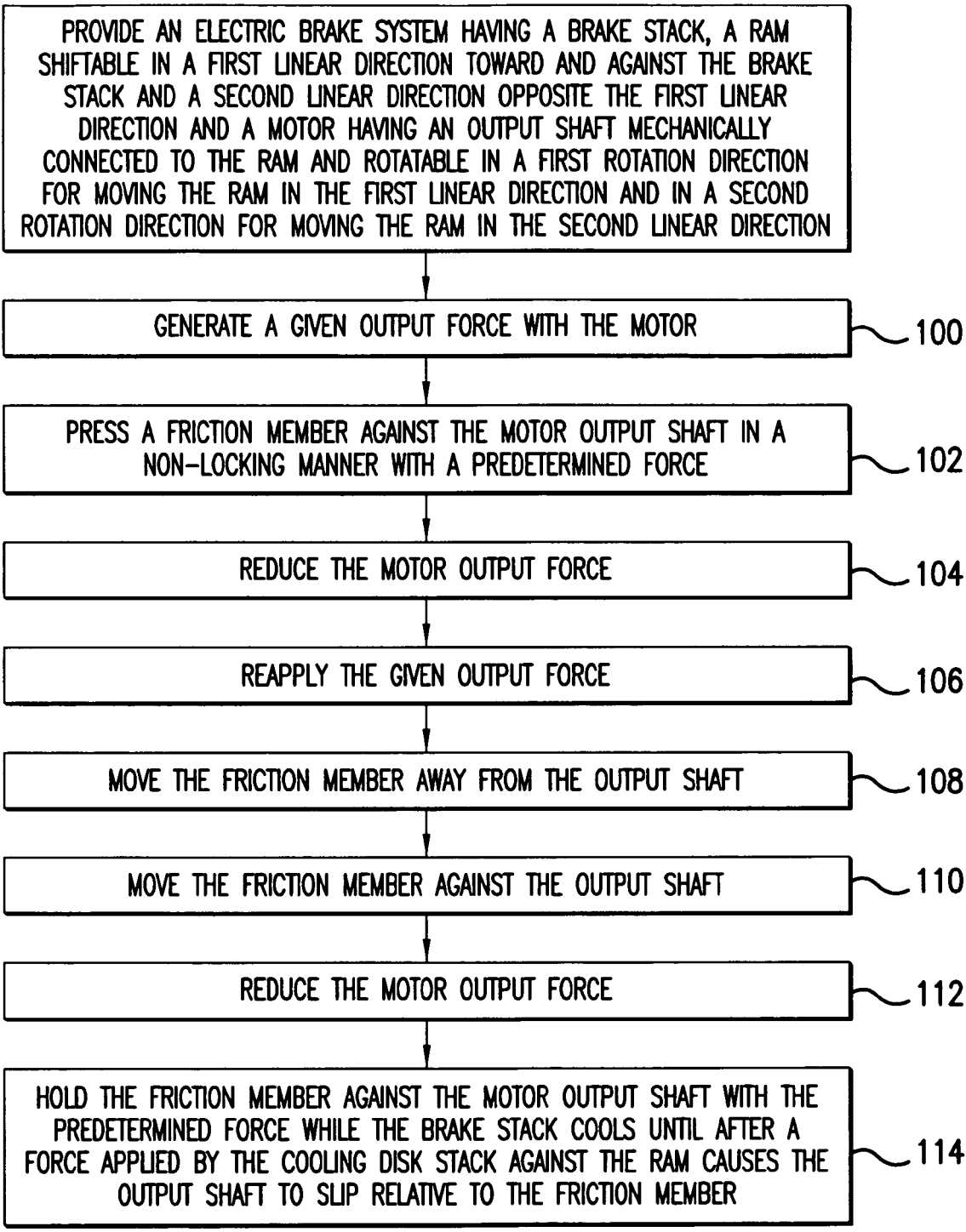
FIG. 5 is a flow chart illustrating a method of controlling the brake system of FIG. 1.

A method according to an embodiment of the present invention is illustrated in the flow chart of FIG. 5. This method is practiced with an electromagnetic braking system that includes a brake stack, a ram shiftable in a first linear direction toward and against the brake stack and a second linear direction opposite the first linear direction, and a motor having an output shaft mechanically connected to the ram and rotatable in a first rotation direction for moving the ram in the first linear direction and in a second rotation direction for moving the ram in the second linear direction. The method includes a step 100 of generating a given output force with the motor, a step 102 of pressing a friction member against the motor output shaft in a non-locking manner with a predetermined force and a step 104 of reducing the motor output force. The method further includes a step 106 of reapplying the given output force, a step 108 of moving the friction member away from the output shaft and a step 110 of moving the friction member against the output shaft. The method also includes a step 112 of reducing the motor output force and a step 114 of holding the friction member against the motor output shaft with the predetermined force while the brake stack cools until after a force applied by the cooling disk stack against the ram causes the output shaft to slip relative to the friction member.

The present invention has been described herein in terms of several preferred embodiments. Obvious additions and modifications to these embodiments will become apparent to those skilled in the relevant arts upon a reading of the foregoing disclosure. It is intended that all such obvious modifications and additions form a part of the present invention to the extent that they fall within the scope of the several claims appended hereto.

I claim:

1. In an electromagnetic braking system comprising a brake stack, a ram shiftable in a first linear direction toward and against the brake stack and a second liner direction opposite the first linear direction, and a motor having an output shaft mechanically connected to the ram and rotatable in a first rotation direction for moving the ram in the first linear direction and in a second rotation direction for moving the ram in the second linear direction, a method for performing a park brake operation with the electromagnetic braking system and limiting the force exerted by a cooling brake stack on the motor comprising the steps of:

providing at least one friction member having a friction surface adjacent to the motor output shaft;

moving the at least one friction surface against the motor output shaft in a non-locking manner; and holding the at least one friction surface against the output shaft with a predetermined force to perform the park brake operation;

whereby the predetermined force is low enough to allow the motor output shaft to slip relative to the friction surface when a force on the output shaft exceeds a predetermined level, so that said motor is back driven, a torque on said output shaft is consequently reduced until slipping of said output shaft stops, and said output shaft is again held in position to continue to perform said park brake operation.

2. The method of claim 1 wherein said step of providing at least one friction surface comprises the steps of providing first and second opposed friction surfaces and moving one of the first and second friction surfaces toward the other of the first and second friction surfaces to clamp the motor output shaft.

3. The method of claim 2 including the additional step of locking the first and second friction surfaces relative to one another.

4. An electromagnetic braking system comprising:

a brake stack;

a ram shiftable in a first linear direction toward and against the brake stack and in a second linear direction opposite the first linear direction;

a motor having an output shaft mechanically connected to the ram and rotatable in a first rotation direction for moving the ram in the first linear direction and in a second rotation direction for moving the ram in the second linear direction;

at least one friction member having a friction surface mounted adjacent to the motor output shaft; and an actuator for moving the friction surface of the at least one friction member against the motor output shaft in a non-locking manner and holding the friction member against the motor output shaft with a predetermined force to perform a park brake function;

wherein the predetermined force is low enough to allow the output shaft to slip relative to said one friction member when a rotational force on the output shaft exceeds a given level, so that said motor is back driven, a torque on said shaft is consequently reduced until slipping of said shaft stops, and said shaft is again held in position to continue to perform said park brake function.

5. The braking system of claim 4 wherein said at least one friction member comprises first and second opposed friction members.

6. The braking system of claim 5 wherein said first and second opposed friction members comprise first and second jaws of a clamp.

7. The braking system of claim 4 wherein the motor output shaft comprises a flange, the friction member is positioned adjacent to the flange, and the actuator moves the friction surface of the friction member against the flange.

8. The braking system of claim 7 wherein said at least one friction member comprises first and second opposed friction members on opposite sides of the flange.

9. The braking system of claim 4 including a ballnut/ballscrew assembly mechanically connecting the output shaft to the ram.

10. In an electromagnetic braking system comprising a brake stack, a ram shiftable in a first linear direction toward and against the brake stack and a second linear direction opposite the first linear direction, and a motor having an output shaft mechanically connected to the ram and rotatable in a first rotation direction for moving the ram in the first linear direction and in a second rotation direction for moving the ram in the second linear direction, a method of performing a park brake operation and limiting the braking force applied by the ram to the brake stack as the brake stack cools comprising the steps of:

a) generating a given output force with the motor;

b) pressing a friction member against the motor output shaft in a non-locking manner with a predetermined force;

c) reducing the motor output force;

d) reapplying the given output force;

e) moving the friction member away from the output shaft;

f) moving the friction member against the output shaft;

g) reducing the motor output force; and h) holding the friction member against the motor output shaft with the predetermined force while the brake stack cools until after a force applied by the cooling disk stack against the ram causes the output shaft to slip relative to the friction member.

11. The method of claim 10 including the additional steps of:

measuring a temperature of the brake disk stack; and
repeating steps d through g until the temperature of the disk stack stops increasing.

12. The method of claim 10 including the additional step of repeating steps d through g a predetermined number of times.

* * * * *